United States Patent
Katz et al.

(10) Patent No.: US 11,922,111 B2
(45) Date of Patent: Mar. 5, 2024

(54) PERSONALIZED FONTS

(71) Applicant: SNAP INC., Santa Monica, CA (US)

(72) Inventors: Sagi Katz, Yokneam Ilit (IL); Ilya Levin, Haifa (IL)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/988,547

(22) Filed: Nov. 16, 2022

(65) Prior Publication Data
US 2023/0076523 A1    Mar. 9, 2023

Related U.S. Application Data

(63) Continuation of application No. 17/000,847, filed on Aug. 24, 2020, now Pat. No. 11,520,970.

(60) Provisional application No. 62/904,114, filed on Sep. 23, 2019.

(51) Int. Cl.
| | |
|---|---|
| *G06F 40/149* | (2020.01) |
| *G06F 16/13* | (2019.01) |
| *G06F 16/172* | (2019.01) |
| *G06F 40/109* | (2020.01) |
| *H04L 51/046* | (2022.01) |

(52) U.S. Cl.
CPC ............ *G06F 40/109* (2020.01); *G06F 16/13* (2019.01); *G06F 16/172* (2019.01); *H04L 51/046* (2013.01)

(58) Field of Classification Search
CPC ...... G06F 40/109; G06F 16/13; G06F 16/172; H04L 51/046
See application file for complete search history.

(56) References Cited

U.S. PATENT DOCUMENTS

| | | | |
|---|---|---|---|
| 5,577,177 A | 11/1996 | Collins et al. | |
| 5,781,714 A | 7/1998 | Collins et al. | |
| 6,065,008 A * | 5/2000 | Simon ................. | G06F 21/10 |
| | | | 707/999.009 |
| 6,446,115 B2 * | 9/2002 | Powers ................ | G06Q 10/107 |
| | | | 455/418 |
| 6,958,755 B1 | 10/2005 | Dickens | |
| 9,430,450 B1 * | 8/2016 | Blinn ................... | G06F 9/451 |

(Continued)

FOREIGN PATENT DOCUMENTS

| | | | | |
|---|---|---|---|---|
| CA | 2728497 A1 * | 12/2009 | ............ | G06F 17/211 |
| CA | 2825155 A1 * | 8/2012 | ............ | G06F 17/21 |

(Continued)

OTHER PUBLICATIONS

Azadi, Samaneh, Transfer Your Font Style with GANs, Berkeley Artificial Intelligence Research (published Mar. 13, 2018) (available at https://bair.berkeley.edu/blog/2018/03/13/mcgan/) (Year: 2018).

(Continued)

*Primary Examiner* — Shahid K Khan
(74) *Attorney, Agent, or Firm* — Culhane Meadows PLLC; Stephen J. Weed

(57) ABSTRACT

Methods and system for creating and managing personalized fonts. Personalized fonts are created by applying personalization parameters to a base font using a style application method or module such as a neural style transformation. The personalized fonts may be transferred to recipients of textual communications to enable the recipient to read messages from a sender in the personalized font of the sender.

20 Claims, 9 Drawing Sheets

(56) References Cited

U.S. PATENT DOCUMENTS

| | | | |
|---|---|---|---|
| 9,781,149 B1* | 10/2017 | Himler | H04L 63/1425 |
| 10,140,392 B1* | 11/2018 | Bowen | G06Q 10/103 |
| 10,503,810 B2 | 12/2019 | Ellis et al. | |
| 10,733,325 B1 | 8/2020 | Goodsitt et al. | |
| 11,520,970 B2 | 12/2022 | Katz et al. | |
| 2004/0260470 A1 | 12/2004 | Rast | |
| 2006/0129475 A1* | 6/2006 | Badenhorst | G06Q 40/04 |
| | | | 705/37 |
| 2007/0061714 A1 | 3/2007 | Stuple et al. | |
| 2008/0280633 A1 | 11/2008 | Agiv | |
| 2009/0177749 A1* | 7/2009 | McLean | H04L 67/54 |
| | | | 709/206 |
| 2012/0001922 A1* | 1/2012 | Escher | G06F 40/123 |
| | | | 345/467 |
| 2012/0017172 A1 | 1/2012 | Sheth et al. | |
| 2012/0150680 A1 | 6/2012 | Golus et al. | |
| 2012/0231774 A1 | 9/2012 | Blades | |
| 2014/0006533 A1 | 1/2014 | Zuo et al. | |
| 2014/0281922 A1 | 9/2014 | Hsu et al. | |
| 2015/0193387 A1 | 7/2015 | Ho et al. | |
| 2015/0195092 A1* | 7/2015 | Bartkiewicz | G09C 5/00 |
| | | | 713/176 |
| 2015/0278658 A1 | 10/2015 | Hara | |
| 2016/0092409 A1 | 3/2016 | Henaff | |
| 2016/0125371 A1* | 5/2016 | Grassadonia | G06Q 20/3223 |
| | | | 705/44 |
| 2016/0294742 A1 | 10/2016 | Weaver et al. | |
| 2016/0371232 A1 | 12/2016 | Ellis et al. | |
| 2017/0091155 A1 | 3/2017 | Rajashekara et al. | |
| 2017/0262414 A1 | 9/2017 | Pao et al. | |
| 2018/0247357 A1 | 8/2018 | Gaskin et al. | |
| 2019/0095255 A1* | 3/2019 | Anima | G06F 9/543 |
| 2021/0141464 A1 | 5/2021 | Jain et al. | |

FOREIGN PATENT DOCUMENTS

| | | | | |
|---|---|---|---|---|
| CN | 103931216 A | * | 7/2014 | H04L 51/28 |
| EP | 3001377 A1 | * | 3/2016 | G06F 17/214 |
| JP | 2006171899 A | * | 6/2006 | |
| JP | 4434355 B2 | * | 3/2010 | G06F 17/214 |
| KR | 20200032090 A | * | 10/2020 | |
| WO | 9429782 A2 | | 12/1994 | |
| WO | 2010084206 A1 | | 7/2010 | |
| WO | WO-2010084205 A1 | * | 7/2010 | G06F 17/214 |
| WO | WO-2010084207 A1 | * | 7/2010 | G06F 17/214 |
| WO | 2011020259 A1 | | 2/2011 | |
| WO | WO-2015047205 A1 | * | 4/2015 | G06F 3/04842 |
| WO | 2019008519 A1 | | 1/2019 | |
| WO | 2021169267 A1 | | 9/2021 | |

OTHER PUBLICATIONS

Bhupalam, Neural Style Transfer For Fonts, Int'l Journal of Eng'g Research in Computer Science and Eng'g (IJERCSE), vol. 5, Issue 10 (Year: 2018).

International Search Report and Written Opinion for International Application No. PCT/US2020/047614, dated Nov. 27, 2020 (dated Nov. 27, 2020)—11 pages.

Jarvis, Dan, How Does Prisma Work? (published Oct. 30, 2016) (available at https://daj.medium.com/ how-does-prisma-work-f434273da92a) (Year: 2016).

Prototypo. Create unlimited typeface variations with a few swipes. Prototypo, Jul. 22, 2019, Retrieved from the Internet: . pp. 1-3.

* cited by examiner

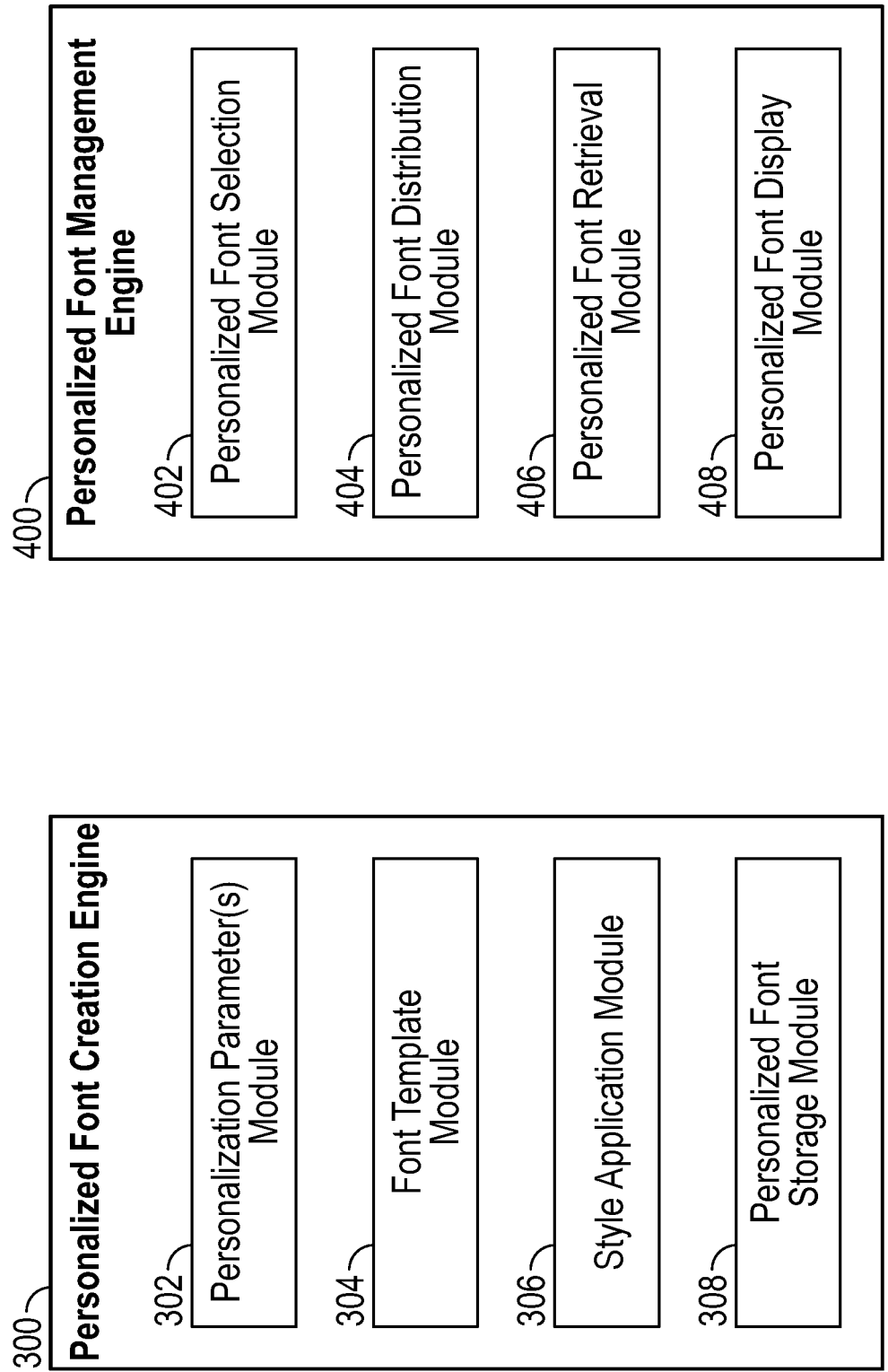

PERSONALIZED FONTS

CROSS-REFERENCE TO RELATED APPLICATIONS

This application is a Continuation of U.S. application Ser. No. 17/000,847 filed on Aug. 24, 2020, and claims priority to U.S. Provisional Application Ser. No. 62/904,114 filed on Sep. 23, 2019, the contents of both of which are incorporated fully herein by reference.

TECHNICAL FIELD

The present subject matter relates to electronic devices and, more particularly, to creating and using fonts that are personalized to enhance communications using electronic devices.

BACKGROUND

Textual communication is a common means of communication between users of electronic devices (e.g., texting). Textual communication is conventionally performed using standardized computer fonts. A computer font (or font) is typically implemented as a digital data file containing a set of graphically related glyphs, characters, or symbols.

BRIEF DESCRIPTION OF THE DRAWINGS

The drawing figures depict one or more implementations, by way of example only, not by way of limitations. In the figures, like reference numerals refer to the same or similar elements.

FIG. 3 is a block diagram illustrating a personalized font creation engine for creating personalized fonts;

FIG. 4 is a block diagram illustrating a personalized font management engine for use in communicating with personalized fonts;

DETAILED DESCRIPTION

One aspect of the present disclosure describes creation and use of personalized fonts. Deep learning techniques automatically create personalized fonts for use in, for example, the "chat" section of a mobile device application. This enables each user to chat with his/her personalized font, which is unique to the user, e.g., to provide a more engaging user experience.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

Figure 1:
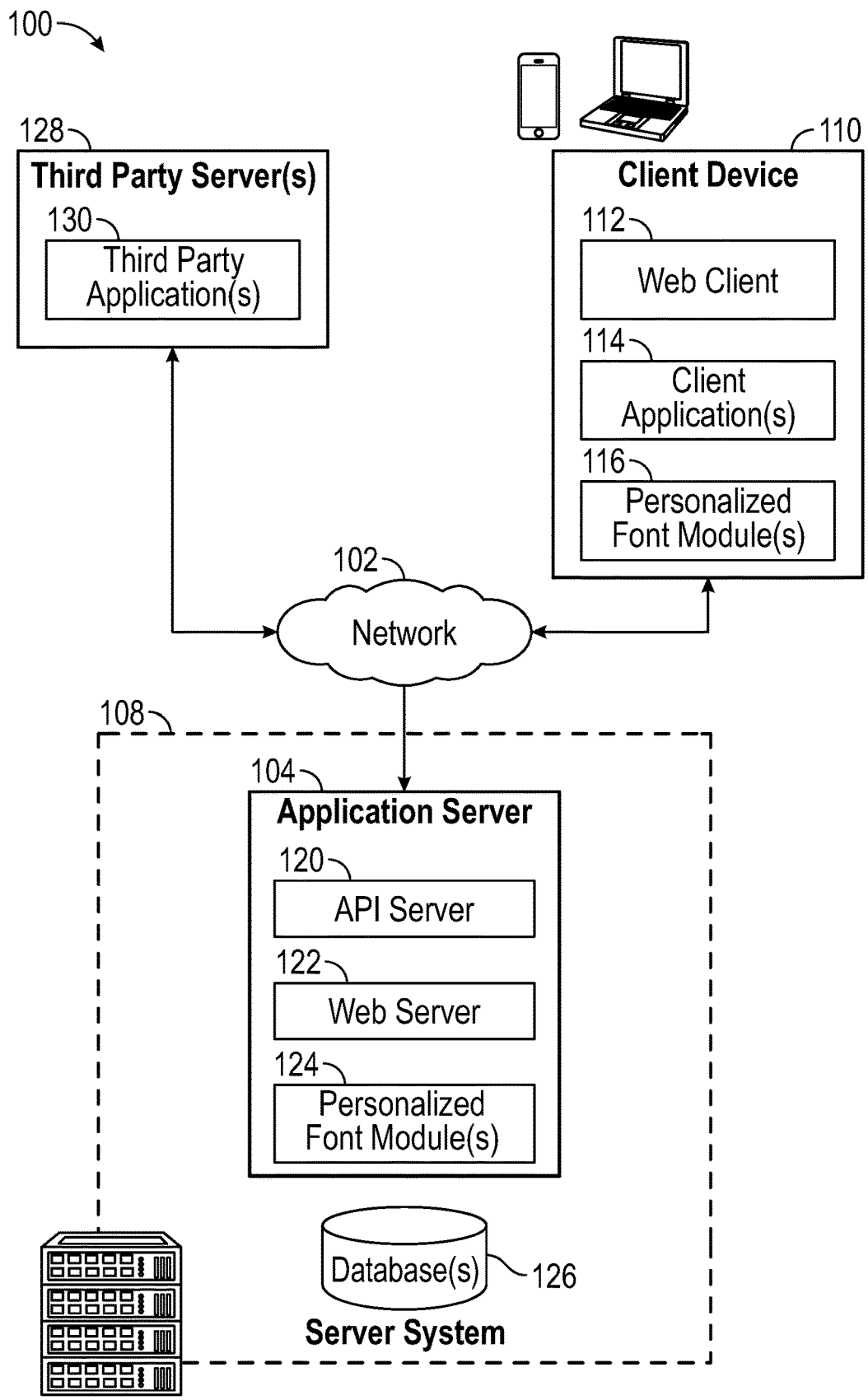
FIG. 1 is a block diagram illustrating a system configured to create and use personalized fonts.

FIG. 1 is a block diagram illustrating a system 100, according to some examples, configured to create and use personalized fonts. The system 100 includes one or more client devices such as client device 110. The client device 110 includes, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform.

For example, client device 110 is a device of a given user who uses an application 114 on an online social platform, a gaming platform, and communication applications. Client device 110 accesses a website, such as an online social platform hosted by a server system 108. The user inputs login credentials associated with the user. Server system 108 receives the request and provides access to the online social platform.

A user of the client device 110 launches and engages an application 114 hosted by the server system 108. The client device 110 includes one or more personalized font modules 116 including a processor running client code for performing the creation and/or use of personalized fonts on the client device 110.

One or more users may be a person, a machine, or other means of interacting with the client device 110. In examples, the user may not be part of the system 100 but may interact with the system 100 via the client device 110 or other means. For instance, the user may provide input (e.g., touch screen input, alphanumeric input, verbal input, or visual input) to the client device 110 and the input may be communicated to other entities in the system 100 (e.g., third-party servers 128, server system 108, etc.) via a network 102 (e.g., the Internet). In this instance, the other entities in the system 100, in response to receiving the input from the user, may communicate information to the client device 110 via the network 102 to be presented to the user. In this way, the user interacts with the various entities in the system 100 using the client device 110.

One or more portions of the network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a 4G LTE network, another type of network, or a combination of two or more such networks.

The client device 110 may access the various data and applications provided by other entities in the system 100 via a web client 112 (e.g., a browser) or one or more client applications 114. The client device 110 may include one or more client application(s) 114 (also referred to as "apps") such as, but not limited to, a web browser, messaging application, multi-player gaming application, electronic mail (email) application, an e-commerce site application, a mapping or location application, and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

The server system 108 provides server-side functionality via the network 102 (e.g., the Internet or wide area network (WAN)) to: one or more third party server(s) 128, and one or more client devices 110. The server system 108 includes an application server 104 including an application program interface (API) server 120, a web server 122, and one or more personalized font modules 124, that may be communicatively coupled with one or more database(s) 126. The one or more database(s) 126 may be storage devices that store data related to users of the server system 108, applications associated with the server system 108, cloud services, and so forth. The one or more database(s) 126 may further store information related to third-party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application, in one example.

The one or more client device personalized font modules 116 and the one or more application personalized font modules 124 are stored on the device 110 and/or server 108 to optimize processing efficiency. In some examples, all modules for performing a specific task such as creating a font are stored on the device/server performing that action. In other examples, some modules for performing a task are stored on the device 110 and other modules for performing that task are stored on the server 108 and/or other devices. In some examples, modules may be duplicated on the device 110 and the server 108.

The one or more third-party application(s) 130, executing on third-party server(s) 128 may interact with the server system 108 via API server 120 via a programmatic interface provided by the API server 120. For example, one or more of the third-party applications 130 may request and utilize information from the server system 108 via the API server 120 to support one or more features or functions on a website hosted by the third party or an application hosted by the third party. The third-party application(s) 130, for example, may provide software version analysis functionality that is supported by relevant functionality and data in the server system 108.

Figure 2:
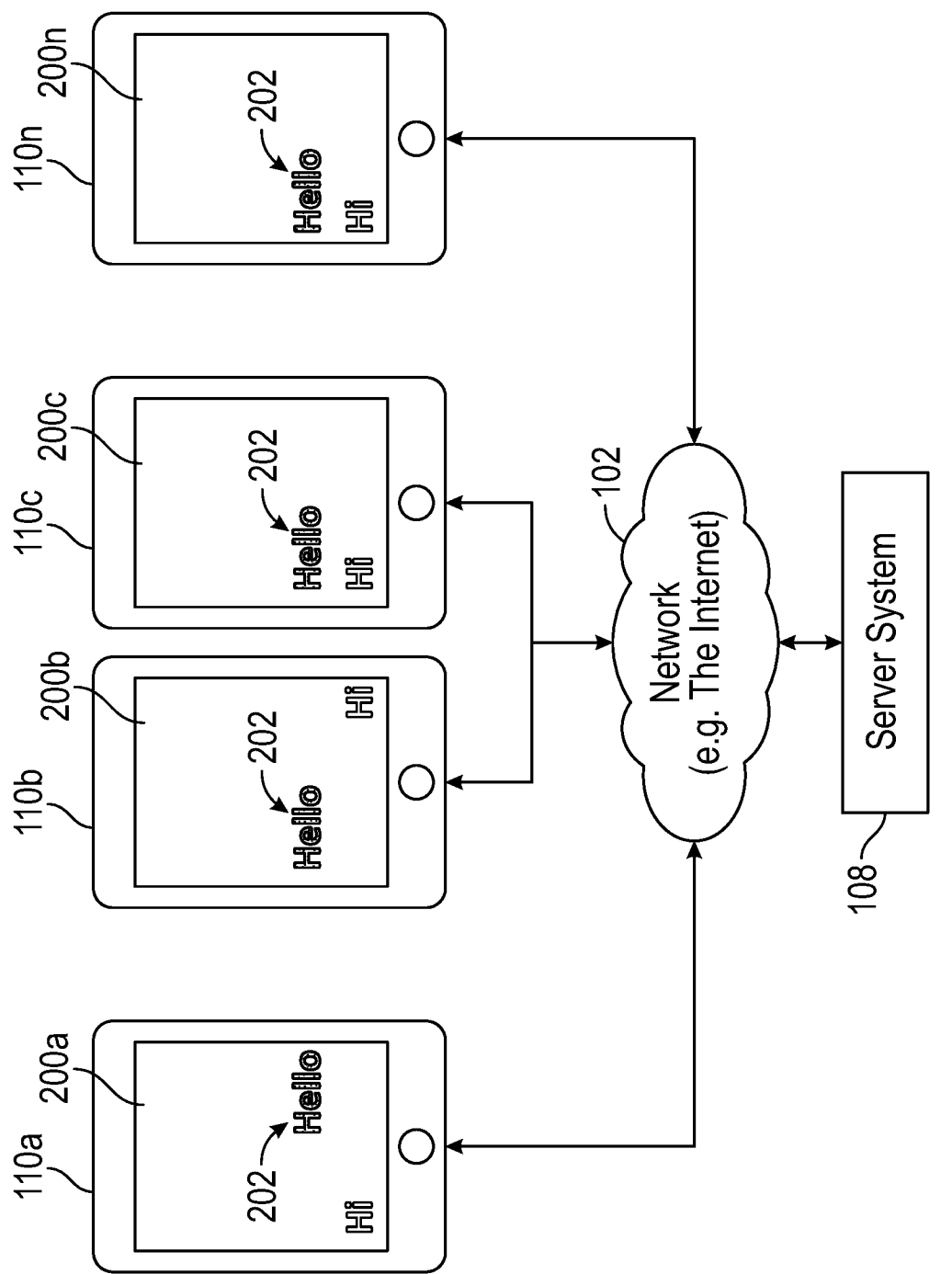
FIG. 2 is a block diagram illustrating communication with personalized fonts.

FIG. 2 provides an overview of one example for communicating using personalized fonts among a plurality of user device 110a-n. The mobile devices 110 in FIG. 2 each include a respective screen 200a-n. On a respective screen, text origination at the mobile device 110 is depicted adjacent the right edge of the screen 200 and text received from another device 110 is depicted adjacent the left edge of the screen 200. The sever system 108 coordinates communication among the device 110 via the network 102.

Figure 5A:
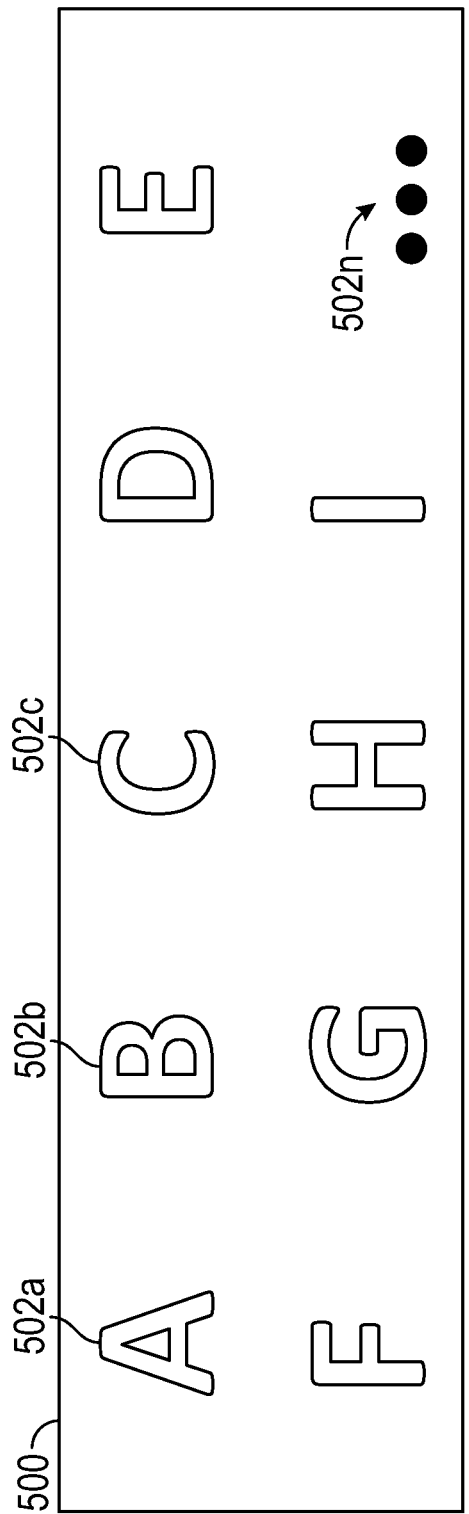
FIG. 5A is an illustration of an example base font used in the creating of a personalized font.
Figure 5B:
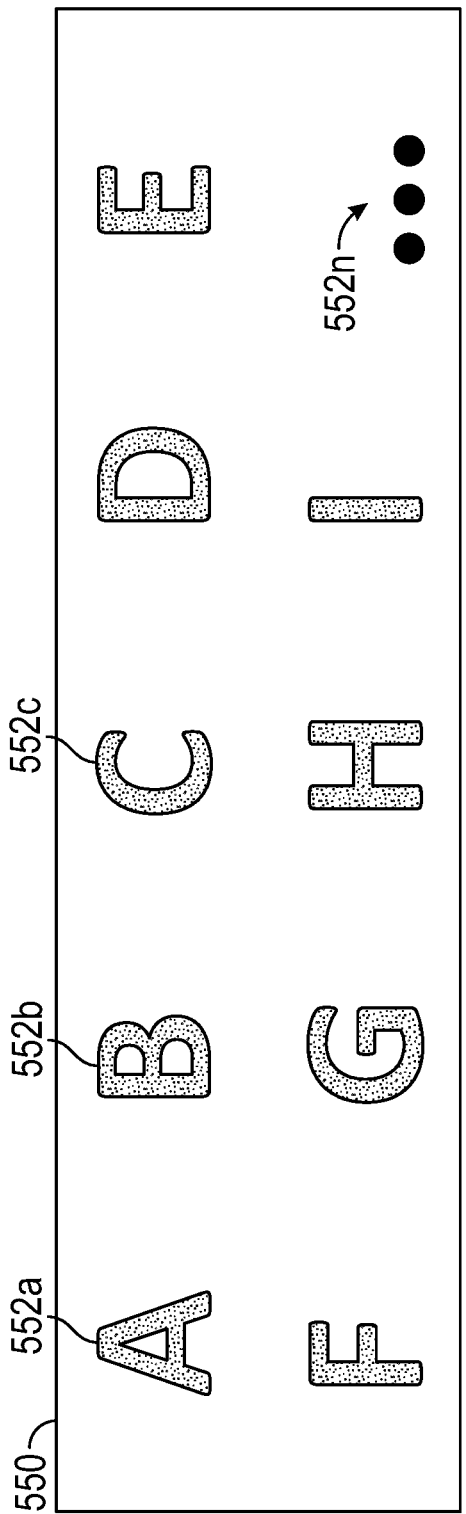
FIG. 5B is an illustration of an example representing a personalized font.

The user of device 110a first creates a personalized font (such as the font used to depict "Hello" 202 on screen 200a; e.g., font 550; FIG. 5B) and the user of device 110b creates another personalized font (such as the font used to depict "Hi" on screen 200b). The user of device 110a sends the textual message "Hello" 202 to users of other devices 110b-n. The other devices 110b-n display the textual message "Hello" 202 in the personalized font of the user of device 110a. The user of device 110b responds with the textual message "Hi!" 204 to users of other devices 110a and c-n. The other devices 110a and c-n display the textual message "Hi!" 204 in the personalized font of the user of device 110b. Thus, each user of a device 110 may have their own personalized font for textual communication.

FIG. 3 depicts a personalized font creation engine 300. Personalized font creation engine 300 includes a personalization parameter(s) module 302, a font template module 304, a style application module 306 (e.g., a module implementing a Neural Style Transfer algorithm; NST), and a personalized font storage module 308. Upon execution (e.g., by a processor(s) within the device 110 and/or server 108), the modules of the engine 300 enable a user to create a personalized font and to store the personalized font for later usage.

The personalization parameter(s) module 302 gathers one or more personalization parameters for and/or associated with a user for use in creating a personalized font. The personalization parameters may be selected by a user or may be automatically determined by the device. Personalization parameters may include one or more of an image or collection of images (e.g., of a favorite painting(s), a favorite picture(s), a most viewed image by the client device 110, a picture of an existing font, a Bitmoji®, etc.), or other parameter that is associated with the user.

The font template module 304 identifies a font template for adaptation to create a personalized font. In one example, the font template module includes a single base font such as font 500 (including multiple characters 502a-n; FIG. 5A). In another example, the font template module 304 includes a plurality of base fonts, which it presents for selection by a user. In yet another example, font template module 304 solicits base font information from a user. For example, the font template module may receive an image including one or more characters of an existing font from the user, which the module processes to extract font characteristic features of the one or more characters. The module may then generate the obtained font from the extracted font characteristic features.

The style application module 306 creates a personalized font based on the personalization parameter(s) and the font template. The font template module creates a personalized font, which is represented by font 550 (including multiple characters 552a-n; FIG. 5A)—a simplistic representation for description purposes.

In one example, the style application module 306 feeds the base font (e.g., font 550; FIG. 5A) though a convolutional neural network (CNN), and network activations are sampled within the neural network architecture at a late stage to obtain "content." The personalization parameter(s) are then fed through the same CNN, and network activations are sampled within the neural network architecture at an earlier stage (e.g., an early to mid stage). The style application module 306 then encodes activations for the personalization parameter(s) into a matrix representation (e.g., a Gramian matrix representation) to obtain a "style." The style application module 306 then applies an iterative optimization (e.g., gradient descent) using the samples and activations to synthesize a personalized output font that exhibits the content of the base font applied with the style of the personalization parameter(s). Other techniques for creating a personalized font using NST will be understood by one of skill in the art from the description herein.

The personalized font storage module 308 stores the personalized font (e.g., in the device 110 and/or the server 108) for later use. Personalized font storage module may create a bitmap font or a vector font. In one example, the font is stored in a color font file, which is a conventional computer font file that embeds additional data to display more graphic properties than the contour shapes of a character. The color fonts may be stored as scalable vector graphics (SVG) data inside OpenType font files, which may contain vector shapes with color or gradients, and may also include bitmap images. Color fonts based on vector glyphs can be resized without any loss, just like any regular font. Color bitmap fonts, like any other photo or pixel-based image, will scale properly up to a certain size, depending on their original resolution. The lettering beyond that resolution may look pixelated. Additionally, pixilation may occur if an image used for personalization is much smaller than the font.

FIG. 4 depicts a personalized font management engine 400. Personalized font management engine 400 includes a personalized font selection module 402, a personalized font distribution module 404, a personalized font retrieval module 406, and a personalized font display module 408. Upon execution (e.g., by a processor(s) within the device 110 and/or server 108), the modules of the engine 400 enable textual communication using personalized fonts.

Personalized font selection module 402 selects a personalized font for textual communication. In one example, the personalized font selection module 402 presents a plurality of fonts including one or more personalized fonts to a user upon request for manual selection by the user. In another example, the personalized font selection module 402 automatically selects a personalized font responsive to a prior default identification by the user.

Personalized font distribution module 404 distributes personalized font files. In an example, the personalized font distribution module 404 monitors a device 110 (e.g., a source device) to identify other devices 110 to which textual communications are being or will be sent. The personalized font distribution module 404 may identify an intended recipient(s) of a text message or may identify, for example, contacts identified as "friends" in a social media application. The personalized font distribution module 404 may send a font file including the personalized font to the intended recipients (e.g., for storage and cache and subsequent use when a message is received from a device of a user corresponding to the personalized font).

Personalized font retrieval module 406 retrieves personalized fonts for displaying textual communications from a device of a user corresponding to the personalized font. In an example, personalized font retrieval module 406 monitors source information of incoming textual communications (e.g., based on user identification (ID)) and compares the source information to a database including personalized fonts for users to identify a match. If a match is identified, the personalized font retrieval module retrieves the personalized font corresponding to the identified match.

Personalized font display module 408 displays textual communications in the personalized font of the sender on the device of the recipient. The personalized font display module 408 may display textual communications on a display 200 for a device 110 such as depicted in FIG. 2.

FIG. 5A depicts a font 500 representing a base font for use in creating a personalized font. The font 500 includes a plurality of characters 502a-n. Although only capital letters are depicted, it is to be understood that the characters may include one or more of capital letters, small letter, special characters, symbols, icons, emoji, etc.

FIG. 5B depicts a font 550 representing a personalized font created by applying personalization parameters to the base font. The personalized font 550 includes a plurality of characters 552a-n. Although only capital letters are depicted, it is to be understood that the characters may include one or more of capital letters, small letter, special characters, symbols, icons, emoji, etc. Each personalized font includes one or more attributes, which may include by way of non-limiting example typeface, point size, weight, color, rotation, texture, design, etc.

Figure 6B:
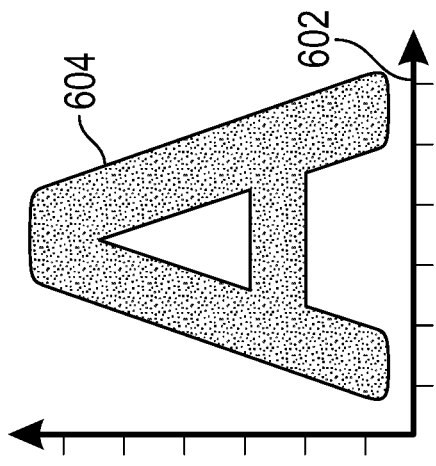
FIGS. 6A, 6B, 6C, and 6D are representative examples of character features within a personalized font.
Figure 6D:
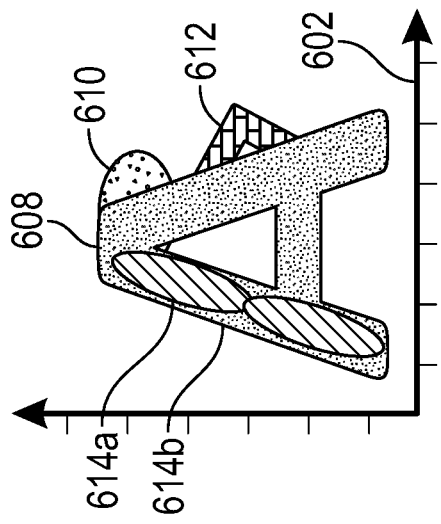
Figure 6A:
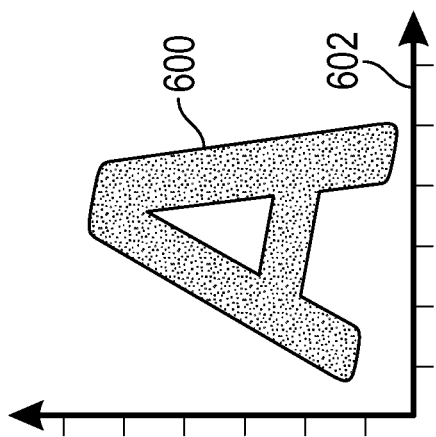
Figure 6C:
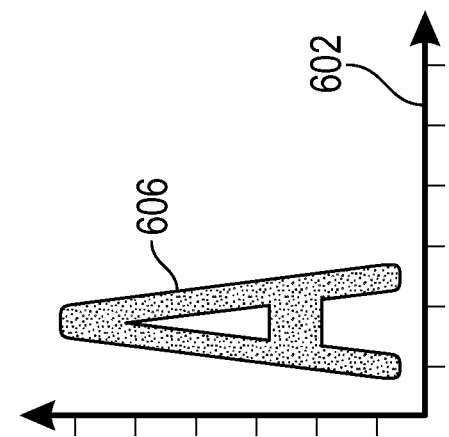

FIGS. 6A-6D depict representative examples of features incorporated into a personalized font. In FIG. 6A, the character 600 is a rotated character. The character 600 is depicted with coordinate lines 602 to facilitate identification of the attribute. In FIG. 6B, the character 604 is an enlarged character. In FIG. 6C, the character 606 is a horizontally lengthened and narrowed character.

In FIG. 6D, the character 608 includes multiple features. The character 608 includes a rounded addition 610 and an angular addition 612. In the illustrated example, the character 608 includes a first colored portion 614a and a second colored portion 614b extending over a portion of the character. Each colored portion 614 may be, for example, a Bitmoji® of a user. In another example, a single colored portion 614a may extend over the entire character.

Figure 7A:
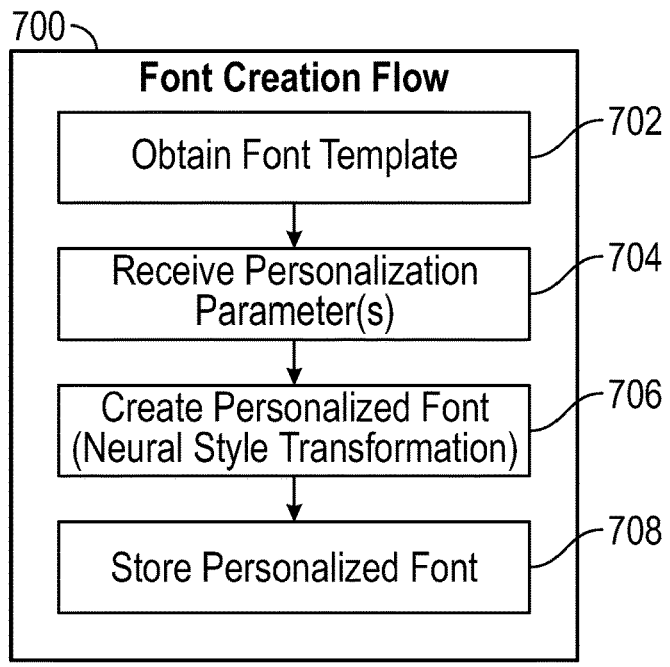
FIG. 7A is a flow diagram illustrating example steps for creating personalized fonts.
Figure 7B:
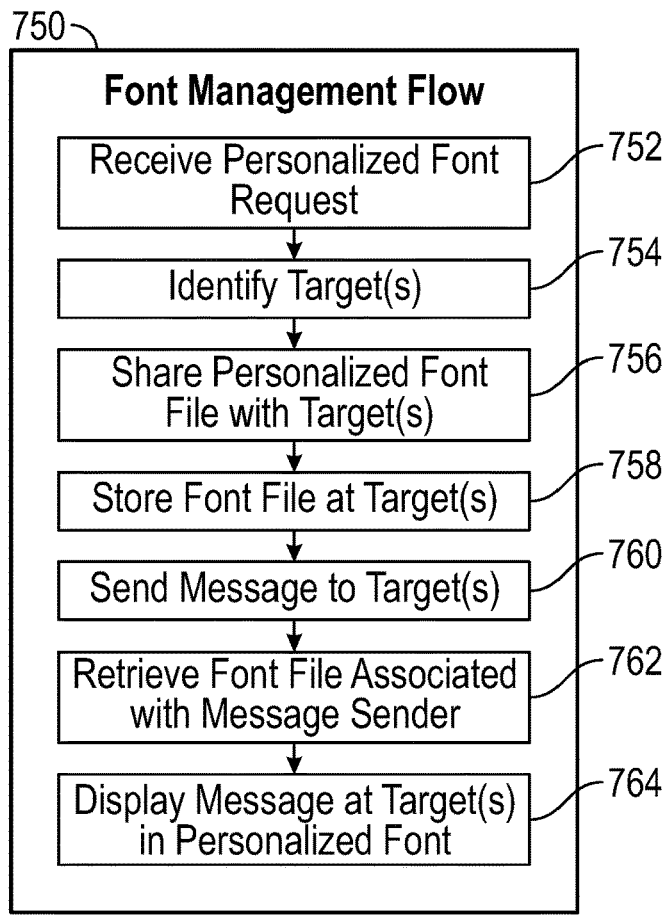
FIG. 7B is a flow diagram illustrating example steps for managing communications with personalized fonts.

FIG. 7A depicts flow chart 700 illustrating example steps for creating a personalized font and FIG. 7B depicts a flow chart 750 illustrating example steps for managing personalized fonts for textual communications. The steps are described with reference to hardware described herein, but are not to be limited to such implementations. Although shown as occurring serially, the blocks of FIGS. 7A and 7B may be reordered or parallelized depending on the implementation. Furthermore, one of skill in the art will understand from the description herein that one or more steps/blocks may be omitted and one or more additional/alternative steps may be incorporated.

At block 702, obtain a font template. The font template module 304 may obtain the font template from a database stored in memory at the device 110 or the server 108.

At block 704, receive personalization parameters. The personalization parameter module 302 may receive the personalization parameter selections from a user via a user input device such as a touch screen to identify the personalization parameters.

At block 706, create a personalized font through style transfer from an image. The style application module 306 may create the personalized font by applying the personalization parameters to the obtained font template.

At block 708, store the personalized font. The personalized font storage module 308 may store the personalized font in memory of the client device 110 and/or the server 108.

Referring now to flow chart 750 of FIG. 7B, at block 752, receive a personalized font request. The personalized font selection module 402 may receive the personalized font request from a user via a user input device such as a touch screen or a microphone.

At block 754, identify targets. The personalized font distribution module 404 may identify the targets. The personalized font distribution module 404 may, for example, monitor a communication application to identify intended recipients of messages or may monitor a social media application to identify "friends" of the user who will likely be targets of future textual communications.

At block 756, share personalized font file with the targets. The personalized font distribution module 404 at the device of the sender may share the personalized font files with the targets directly or through a cloud server, for example.

At block 758, store font files at the targets. The personalized font distribution module 404 at the device of the target/recipient may store the personalized font files, e.g., in cache for fast retrieval when displaying messages from a sender in a personalized font associated with the sender.

At block 760, send messages to the target. A communication application may send messages to the target. The message may include a user ID identifying the sender of the message.

At block 764, display messages at the target in the personalized font of the sender. The personalized font display module 408 may display the messages at the target in the personalized font of the sender, e.g., by comparing the user ID to a list of user IDs for which personalized fonts have been received and retrieving the personalized font associated with the user ID when a match is identified (block 762). The retrieved personalized font can then be used to display the message.

Figure 8:
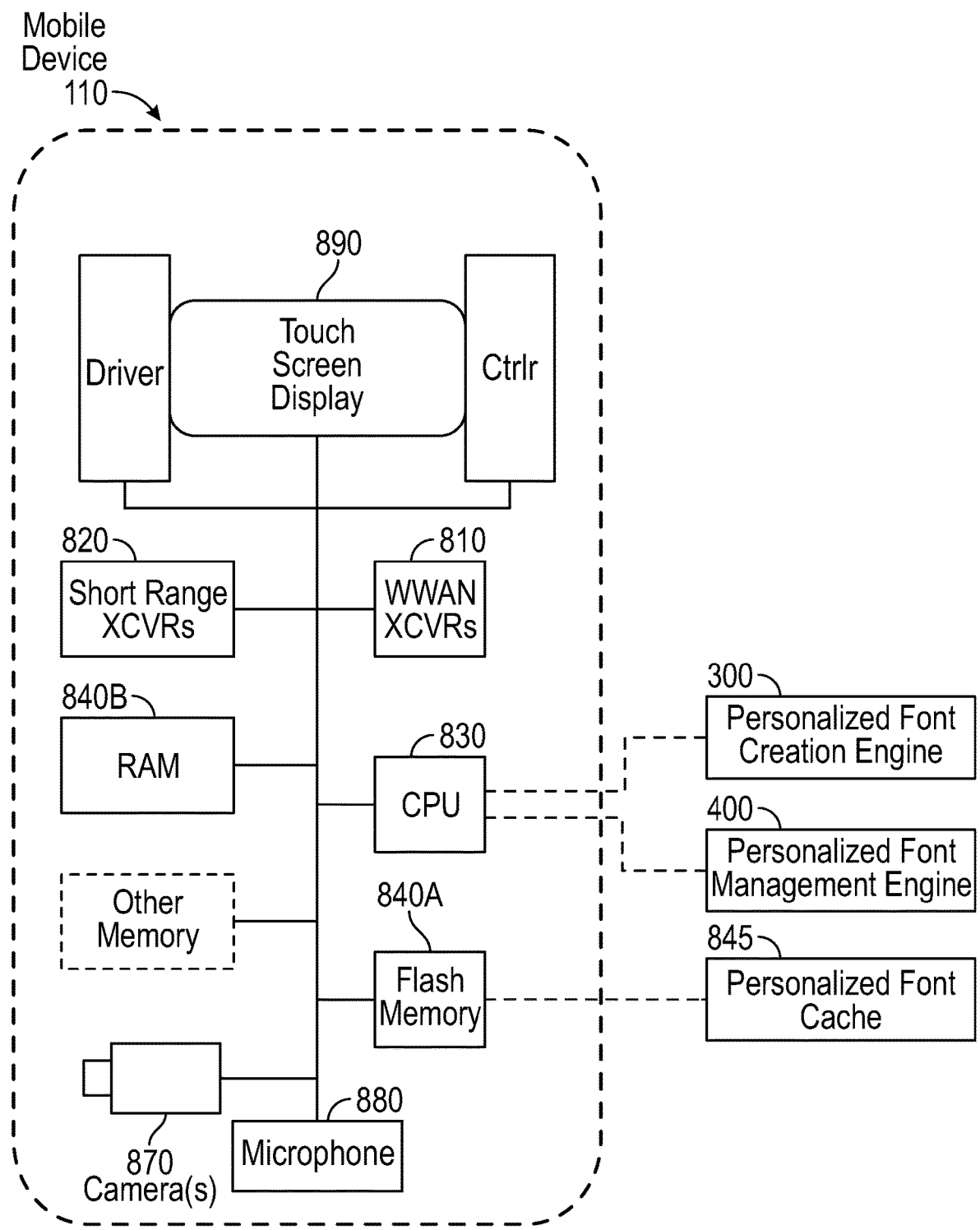
FIG. 8 is a high-level functional block diagram of an example client device comprising a mobile device that communicates via network with server system.
Figure 9:
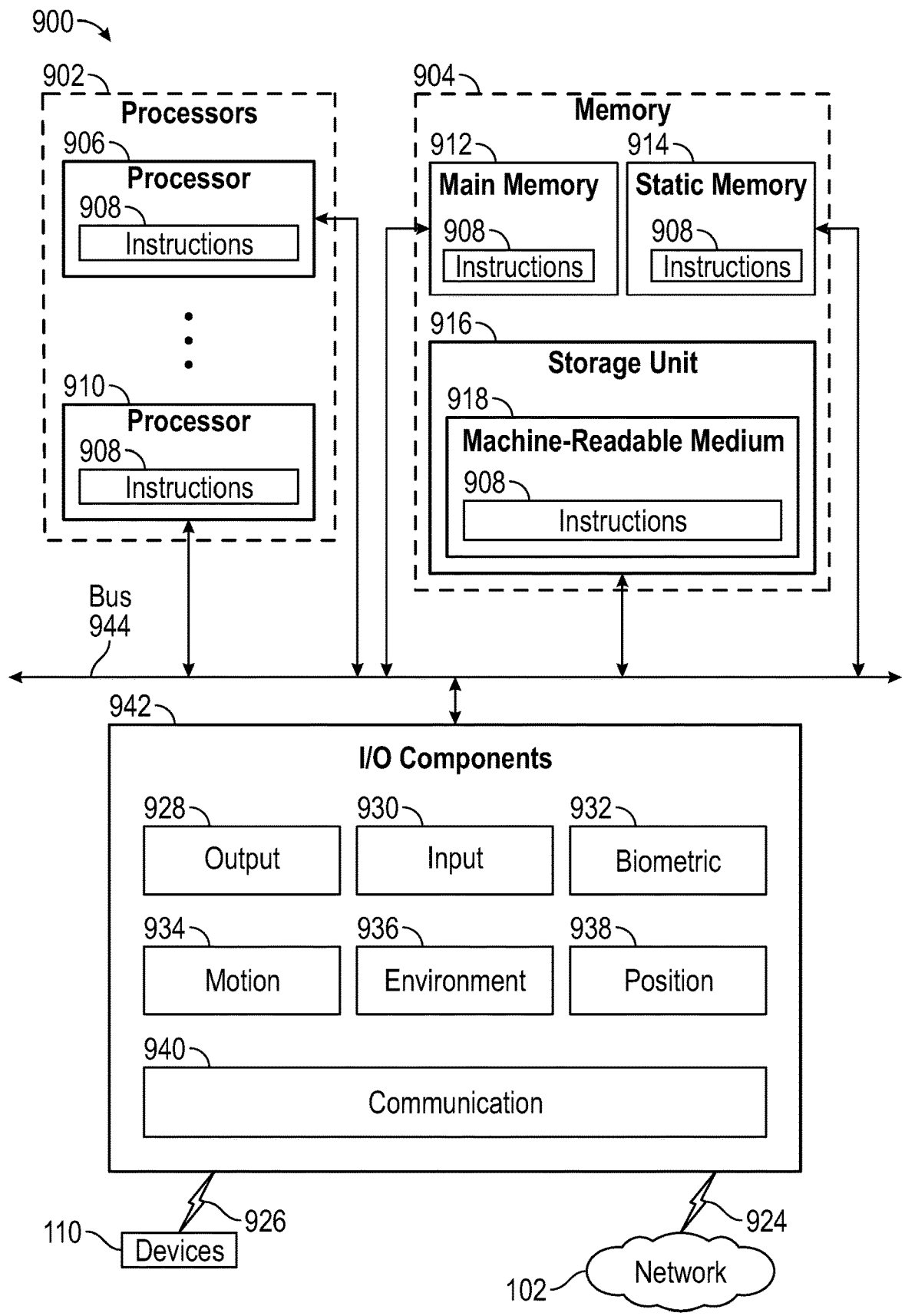
FIG. 9 is a diagrammatic representation of a machine in the form of a computer system within which a set of instructions may be executed for causing the machine to perform any one or more of the methodologies discussed herein, in accordance with some examples.

FIG. 8 is a high-level functional block diagram of an example client device 110 including a mobile device that communicates via network 102 with server system 108 of FIG. 9. Shown are elements of a touch screen type mobile device 890, although other non-touch type mobile devices can be used. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example, and the subject technology as described herein is not intended to be limited thereto. For purposes of this discussion, FIG. 8 therefore provides a block diagram illustration of the example mobile device 110 having a touch screen display for displaying content and receiving user input as (or as part of) the user interface. Mobile device 890 also includes a camera(s) 870, such as visible light camera(s), and a microphone 880.

The activities that are the focus of discussions here involve creating and managing personalized fonts. The personalized font creating engine 300 may be stored in memory 840 for execution by CPU 830 to create personalized fonts. The personalized font management engine 400 may be stored in memory 840 for execution by CPU 830 to manage personalized fonts.

As shown in FIG. 8, the mobile device 110 includes at least one digital transceiver (XCVR) 810, shown as WWAN XCVRs, for digital wireless communications via a wide area wireless mobile communication network 102. The mobile device 110 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11 and 4G LTE.

To generate location coordinates for positioning of the mobile device 890, the mobile device 890 can include a global positioning system (GPS) receiver (not shown). Alternatively, or additionally, the mobile device 110 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 110 for user identification strategies.

Several of these types of communications through the transceivers 810, 820 and a network, as discussed previously, relate to protocols and procedures in support of communications with the server system 108 for obtaining and storing friend device capabilities. Such communications, for example, may transport packet data via the short range XCVRs 820 over the wireless connections of network 102 to and from the server system 108 as shown in FIG. 1. Such communications, for example, may also transport data utilizing IP packet data transport via the WWAN XCVRs 810 over the network (e.g., Internet) 102 shown in FIG. 1. Both WWAN XCVRs 810 and short range XCVRs 820 connect through radio frequency (RF) send-and-receive amplifiers (not shown) to an associated antenna (not shown).

The mobile device 110 further includes a microprocessor 830, shown as a CPU, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Other processor circuitry may be used to form the CPU 830 or processor hardware in smartphone, laptop computer, and tablet.

The microprocessor 830 serves as a programmable host controller for the mobile device 110 by configuring the mobile device to perform various operations, for example, in accordance with instructions or programming executable by processor 830. For example, such operations may include various general operations of the mobile device, as well as operations related to performance metric monitoring, personalized fonts, reporting to server system 108, and gating. Although a processor may be configured by use of hard-wired logic, typical processors in mobile devices are general processing circuits configured by execution of programming.

The mobile device 110 includes a memory or storage device system, for storing data and programming. In the example, the memory system may include a flash memory 840A and a random access memory (RAM) 840B. The RAM 840B serves as short term storage for instructions and data being handled by the processor 830, e.g., as a working data processing memory. The flash memory 840A typically provides longer term storage. Flash memory 840A and/or RAM 840B may include personalized font cache 845 for storing personalized fonts.

Hence, in the example of mobile device 110, the flash memory 840A is used to store programming or instructions for execution by the processor 830. Depending on the type of device, the mobile device 110 stores and runs a mobile operating system through which specific applications, including application 114, are executed. Examples of mobile operating systems include Google Android®, Apple iOS® (I-Phone or iPad devices), Windows Mobile®, Amazon Fire OS®, RIM BlackBerry® operating system, or the like.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to network 102 and client devices 110 via a coupling 924 and a coupling 926, respectively. For example, the communication components 940 may include a network interface component or another suitable device to interface with the network 102. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 110 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 102, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 110.

Figure 10:
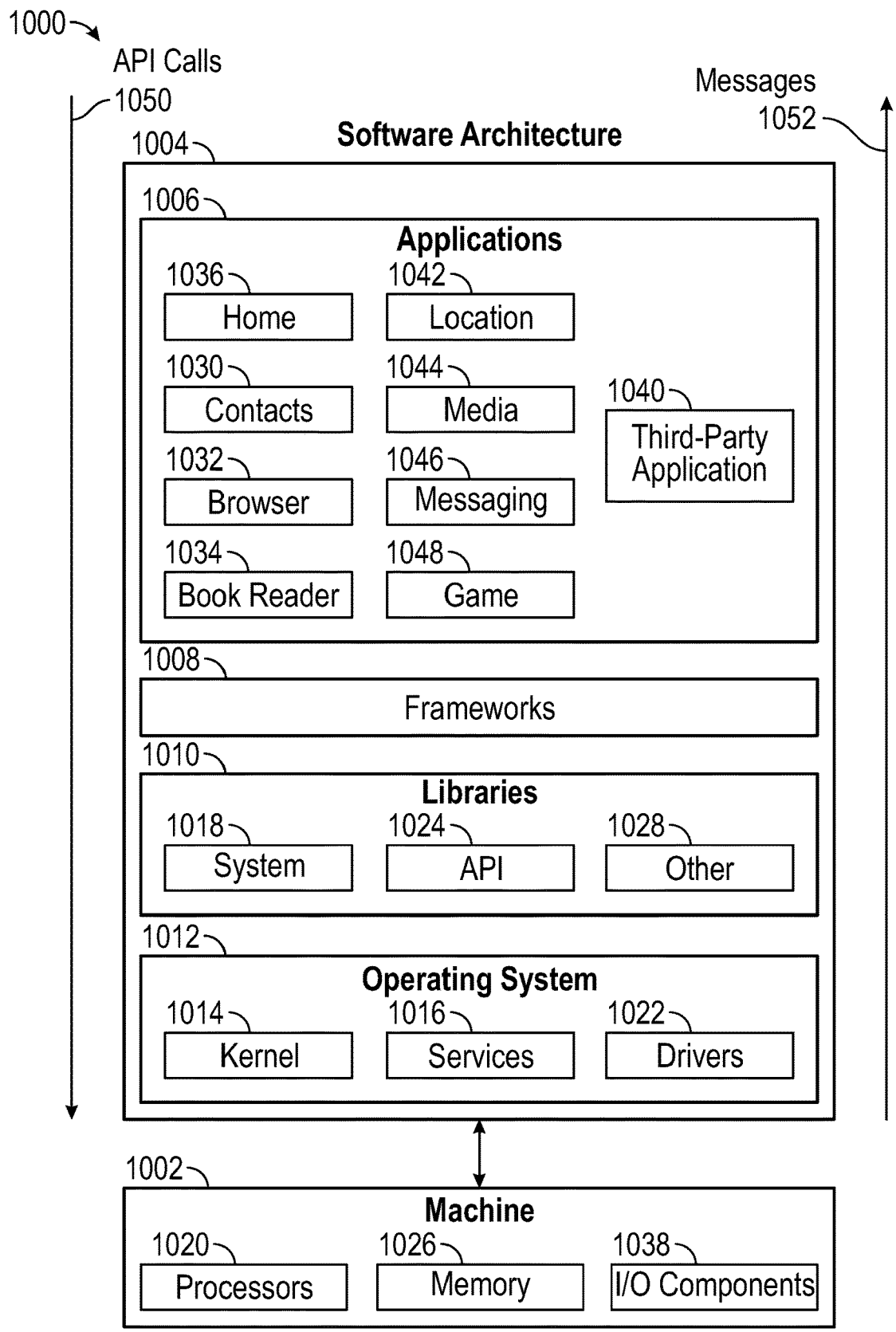
FIG. 10 is block diagram showing a software architecture within which the present disclosure may be implemented, in accordance with examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

What is claimed is:

1. A personalized font management system, the management system comprising a processor implemented on a device, the processor configured to:
   select a personalized font for sending a text message to intended recipients responsive to a user selection;
   identify the intended recipients of the text message by monitoring the device to identify other devices being sent textual communications by the device and distributing the selected personalized font to the other device identified and distributing the selected personalized font to the other devices identified as being sent textual communications;
   retrieve another personalized font for displaying a received textual communication; and
   display the received textual communication in the other personalized font.

2. The personalized font management system of claim 1, wherein the personalized font management system is implemented on an eyewear device.

3. The personalized font management system of claim 1, wherein to select the personalized font for sending the processor is configured to:
   receive a request for a manual selection from the user; and
   present a plurality of fonts including the personalized font to the user in response to the manual selection request.

4. The personalized font management system of claim 1, wherein to select the personalized font for sending the processor is configured to:
   receive a default identification from the user; and
   select the personalized font in response to the default identification.

5. The personalized font management system of claim 1, wherein to retrieve the other personalized font the processor is configured to:
   monitor source information for the received textual communication;
   match the source information to the other personalized font; and
   retrieve the other personalized font in response to the match.

6. The personalized font management system of claim 5, wherein the source information includes a user identification, the other personalized font is associated with the user identification in a database, and to retrieve the other personalized font the processor is configured to retrieve the other personalized font from the database.

7. The personalized font management system of claim 1, wherein the personalized font management system is implemented on a device having a display and wherein to display the received textual communication in the other personalized font the processor is configured to:
   display the received textual communication on the display using the other personalized font.

8. A personalized font management method for implementation on a device, the personalized font management method comprising:
   selecting a personalized font for sending a text message to intended recipients responsive to a user selection;
   identifying the intended recipients of the text message by monitoring the device to identify other devices being sent textual communications by the device and distributing the selected personalized font to the intended recipients by distributing the personalized font to the other devices identified as being sent textual communications;
   retrieving another personalized font for displaying a received textual communication; and
   displaying the received textual communication in the other personalized font.

9. The personalized font management method of claim 8, wherein the personalized font management method is implemented on an eyewear device.

10. The personalized font management method of claim 8, wherein the selecting comprises:
   receiving a request for a manual selection from the user; and
   presenting a plurality of fonts including the personalized font to the user in response to the manual selection request.

11. The personalized font management method of claim 8, wherein the selecting comprises:
   receiving a default identification from the user; and
   selecting the personalized font in response to the default identification.

12. The personalized font management method of claim 8, wherein the retrieving comprises:
   monitoring source information for the received textual communication;
   matching the source information to the other personalized font; and
   retrieving the other personalized font in response to the match.

13. The personalized font management method of claim 12, wherein the source information includes a user identification, the other personalized font is associated with the user identification in a database, and the retrieving the other personalized font in response to the match comprises:
   retrieving the other personalized font from the database.

14. The personalized font management method of claim 8, wherein the personalized font management method is implemented on a device having a display and wherein the displaying comprises:
   displaying the received textual communication on a display using the other personalized font.

15. A non-transitory computer readable medium including instructions for execution by a processor of a device, the instructions, when executed by the processor, configure the processor to:
   select, using a personalized font selection module, a personalized font for sending a text message to intended recipients responsive to a user selection;
   identify the intended recipients of the text message by monitoring the device to identify other devices being sent textual communications by the device and distributing the selected personalized font to the intended recipients by distributing the personalized font to the other devices identified as being sent textual communications;
   retrieve another personalized font for displaying a received textual communication; and
   display the received textual communication in the other personalized font.

16. The non-transitory computer readable medium of claim 15, wherein to retrieve the other personalized font for displaying the received textual communication the instructions configure to the processor to:
   monitor source information for the received textual communication;
   match the source information to the other personalized font; and
   retrieve the other personalized font in response to the match.

17. The non-transitory computer readable medium of claim 16, wherein the source information includes a user identification, the other personalized font is associated with the user identification in a database, and to retrieve the other personalized font the instructions configure the processor to retrieve the other personalized font from the database.

18. The non-transitory computer readable medium of claim 15, wherein to select the personalized font for sending the instructions configure the processor to:
   receive a request for a manual selection from the user; and
   present a plurality of fonts including the personalized font to the user in response to the manual selection request.

19. The non-transitory computer readable medium of claim 15, wherein to select the personalized font for sending the instructions configure the processor to:
   receive a default identification from the user; and
   select the personalized font in response to the default identification.

20. The non-transitory computer readable medium of claim 15, wherein the instructions are implemented by the processor on a device having a display and wherein to display the received textual communication in the other personalized font the instructions configure the processor to:
   display the received textual communication on the display using the other personalized font.

\* \* \* \* \*